United States Patent
Lin

(10) Patent No.: US 9,671,057 B2
(45) Date of Patent: Jun. 6, 2017

(54) SUPPORT PLATE

(71) Applicant: SOLUTION EXPERT 33 INTERNATIONAL CO., LTD., Road Town, Tortola (VG)

(72) Inventor: Ben-Tien Lin, New Taipei (TW)

(73) Assignee: SOLUTION EXPERT 33 INTERNATIONAL CO., LTD., Tortola (VG)

( * ) Notice: Subject to any disclaimer, the term of this patent is extended or adjusted under 35 U.S.C. 154(b) by 0 days.

(21) Appl. No.: 15/185,129

(22) Filed: Jun. 17, 2016

(65) Prior Publication Data
US 2016/0377220 A1   Dec. 29, 2016

(30) Foreign Application Priority Data

Jun. 26, 2015   (TW) .............................. 104210347 U

(51) Int. Cl.
*A47B 97/04*   (2006.01)
*F16M 11/04*   (2006.01)
*F16M 11/38*   (2006.01)

(52) U.S. Cl.
CPC .............. *F16M 11/04* (2013.01); *F16M 11/38* (2013.01)

(58) Field of Classification Search
CPC ................................ F16M 11/04; F16M 11/38
USPC ........ 248/459, 462, 463, 464, 465, 676, 917
See application file for complete search history.

(56) References Cited

U.S. PATENT DOCUMENTS

| | | | | |
|---|---|---|---|---|
| 4,044,980 A | * | 8/1977 | Cummins | A47B 23/043 206/305 |
| 4,455,759 A | * | 6/1984 | Coetsier | G01B 11/2755 33/203.14 |
| 4,722,504 A | * | 2/1988 | Degenholtz | A47B 23/044 248/174 |
| 5,722,628 A | * | 3/1998 | Menaged | A47B 23/043 211/50 |
| 5,946,834 A | * | 9/1999 | Bradley | G09F 1/06 248/174 |
| 6,213,439 B1 | * | 4/2001 | Giulie | A47B 97/04 248/459 |
| 9,455,759 B2 | * | 9/2016 | Jen | H04B 1/3888 |

* cited by examiner

*Primary Examiner* — Gwendolyn Baxter
(74) *Attorney, Agent, or Firm* — Chun-Ming Shih; HDLS IPR SERVICES

(57) ABSTRACT

A support plate is used for supporting an electronic device. The support plate includes a first plate member, a foldable portion, and a second plate member. The foldable portion is connected to the first plate member and the second plate member. The first plate member includes a combining portion far away from the foldable portion and a contact portion adjacent to the foldable portion. The second plate member includes at least one combined portion and a non-slip element attached on a side surface of the second plate member. The combining portion is foldable to combinedly position the combined portion, wherein the contact portion supports the second plate member and forms an included angle with the second plate member. Accordingly, the support plate can stably support the electronic device and can be expanded or received quickly.

11 Claims, 9 Drawing Sheets

SUPPORT PLATE

TECHNICAL FIELD

The present invention relates to a support plate and, in particular, to a support plate for supporting an electronic device.

BACKGROUND

With the development in technology, new electronic devices keep coming out in the market and are closely associated with people's daily life. There are various portable electronic devices in the market, for example: a mobile phone, a personal digital assistant (PDA), a global positioning system (GPS), an electronic book, a laptop computer, an MP3 device, an MP4 device, an electronic tablet device, a digital camera, or etc. People love such devices and use them in everyday life since they have advantages such as small size, light weight, and stylish appearance and can be carried around conveniently.

When using the electronic devices, holding them by hands for a long time easily causes tiredness of the neck and hand. If placing the electronic device on the table, the user has to incline forward to read it, thereby resulting in back pain. Furthermore, when a lamp or light from other light source projected onto a screen of the electronic device, light reflected from the screen makes it difficult to read and operate the electronic device.

However, conventional electronic device supporters are protective covers or similar products for protecting and covering the screens of the electronic devices. When the protective cover is folded up to form a support structure on which the electronic device can lean, the electronic device tends to slide due to the weight itself or improper touches. Moreover, the protective covers are too large, so it is not convenient to store them or carry them around, thus causing troublesome in use.

Accordingly, the inventor made various studies to solve the above-mentioned problems according to his experience in the industry for many years, on the basis of which the preset invention is accomplished.

SUMMARY

It is an object of the present invention to provide a support plate which can support an electronic device stably and can be expanded or received quickly.

Accordingly, the present invention provides a support plate for supporting an electronic device. The support plate includes a first plate member, a foldable portion and a second plate member. The foldable portion is connected to the first plate member and the second plate member. The first plate member includes a combining portion far away from the foldable portion and a contact portion adjacent to the foldable portion. The second plate member includes at least one combined portion and a non-slip element attached on a side surface of the second plate member. The combining portion is foldable to combinedly position the combined portion, wherein the contact portion supports the second plate member and forms an included angle with the second plate member.

BRIEF DESCRIPTION OF THE DRAWINGS

The disclosure will become more fully understood from the detailed description and the drawings given herein below are for illustration only, and thus does not limit the disclosure, wherein.

DETAILED DESCRIPTION

Figure 1:
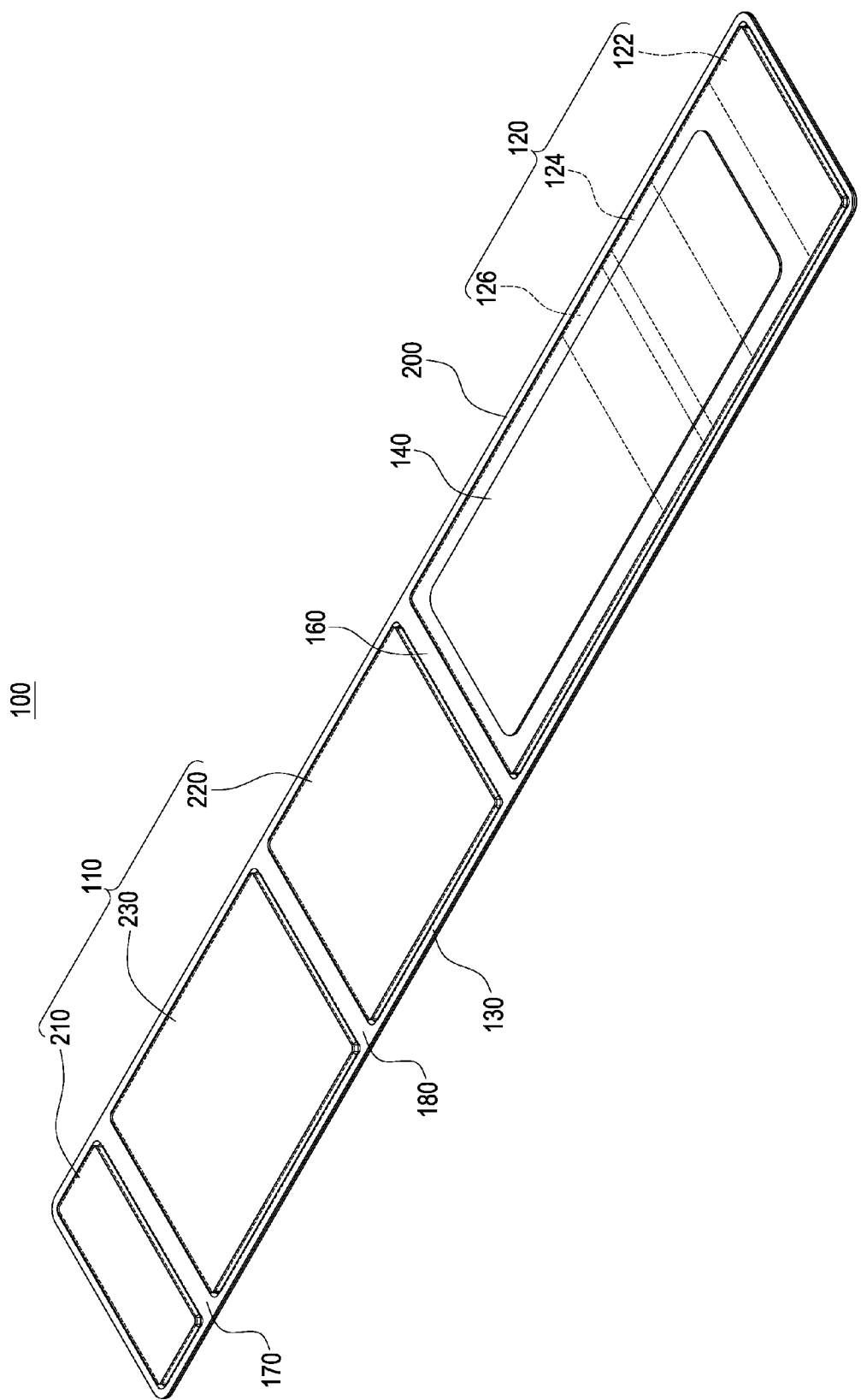
FIG. 1 is schematic view illustrating a support plate in its expanded configuration according to the first embodiment of the present invention.
Figure 2:
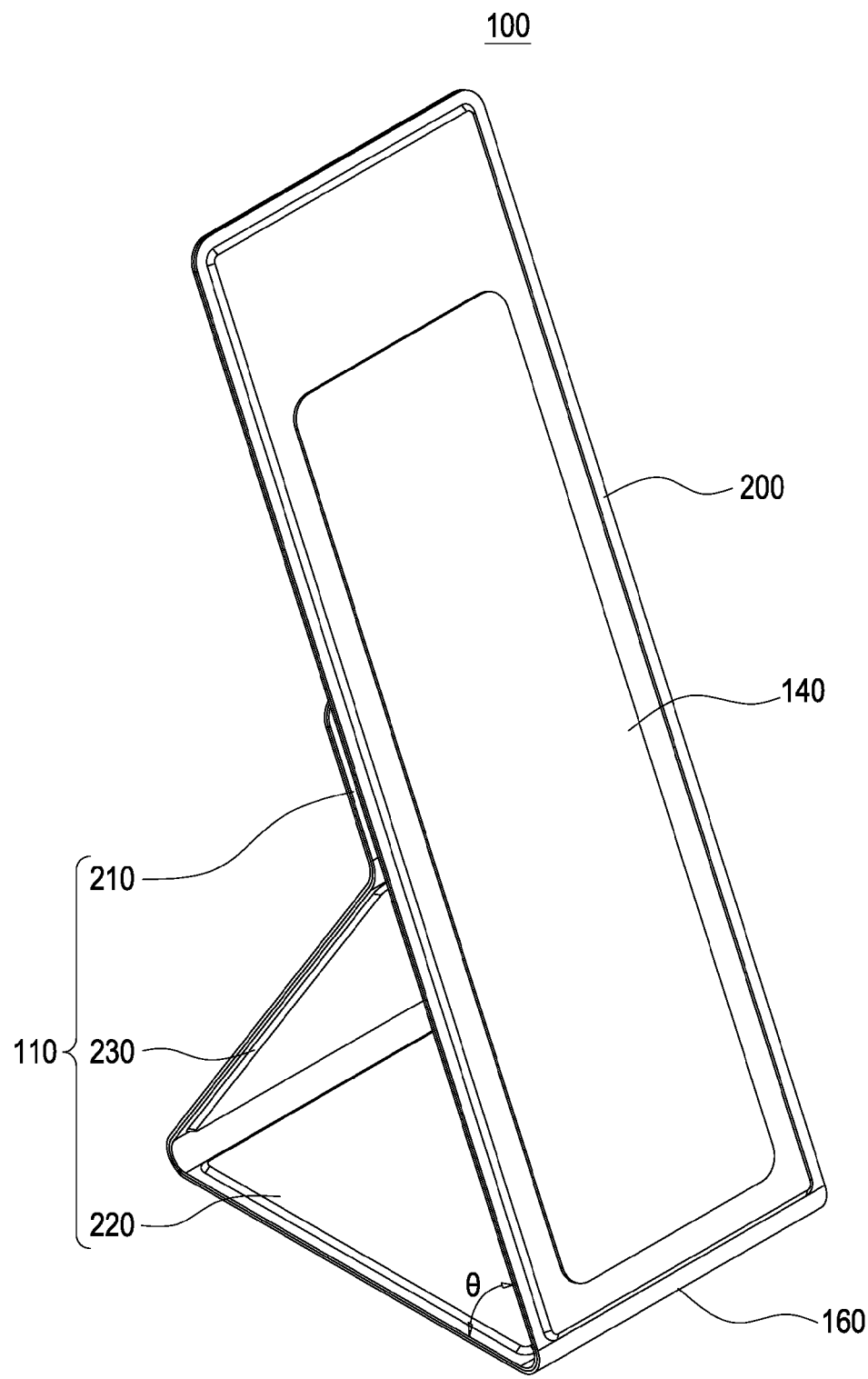
FIG. 2 is a perspective view illustrating the support plate according to the first embodiment of the present invention.
Figure 3:
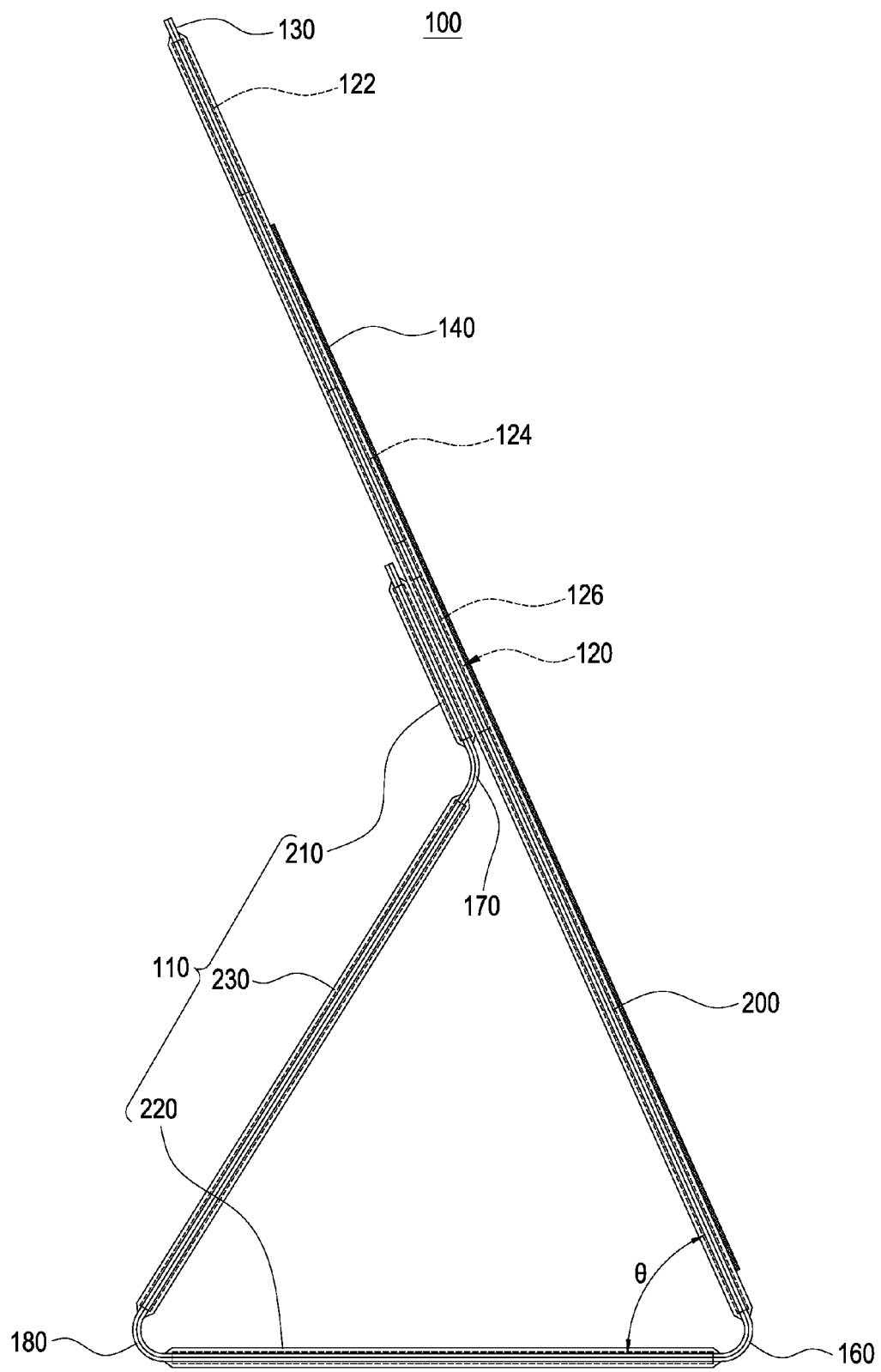
FIG. 3 is a cross-sectional view illustrating the support plate according to the first embodiment of the present invention.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Referring to FIGS. 1 to 4, the present invention provides a support plate 100 for supporting an electronic device 10. The electronic device 10 includes a mobile phone, a tablet computer, a portable computer, or other 3C (computer, communication, consumer) electronic products. As the size of the electronic device 10 varies, the size of the support plate 100 varies to properly support the electronic device 10.

As shown in the drawings, the support plate 100 comprises a first plate member 110, a foldable portion 160, and a second plate member 200. The foldable portion 160 is connected to the first plate member 110 and a second plate member 200. In the embodiment shown in FIGS. 1 and 3, the foldable portion 160 includes a covering portion 130. The covering portion 130 covers the first plate member 110 and the second plate member 200, wherein the foldable portion 160 is the covering portion 130 between the first plate member 110 and the second plate member 200. The covering portion 130 consists of non-woven fabric, rubber, polyurethane (PU), plastic, or other suitable materials.

The first plate member 110 includes a combining portion 210 far away from the foldable portion 160 and a contact portion 220 adjacent to the foldable portion 160. The second plate member 200 includes at least one combined portion 120 and a non-slip element 140 attached on a side surface of the second plate member 200. The combining portion 210 is foldable to combinedly position the combined portion 120, wherein the contact portion 220 supports the second plate member 200 and forms an included angle θ with the second plate member 200.

Figure 4:
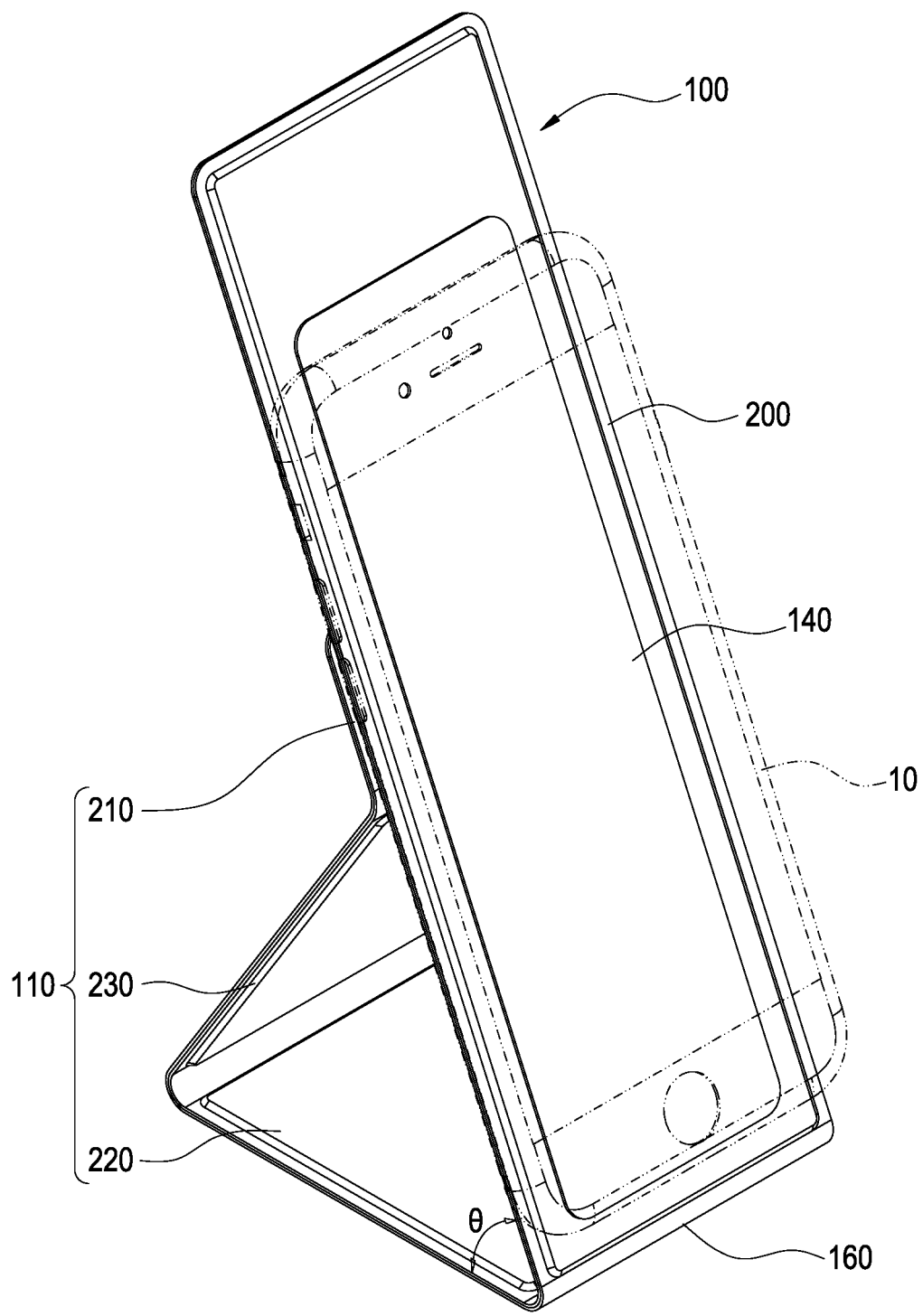
FIG. 4 is a perspective view illustrating the support plate used on an electronic device according to the first embodiment of the present invention.

The non-slip element 140 is disposed on one side opposite to where the combining portion 210 and the combined portion 120 are combinedly positioned. When using the support plate 100 of the present embodiment, the first plate member 110 is folded toward the other side of the non-slip element 140, and the contact portion 220 can be in contact with a working surface, such as a desk, an office table, a vehicle operator seat, or other places, to support the electronic device 10. The non-slip element 140 is an attachable and flexible pad consisting of thermally deformable rubber, resin and a binding agent, thereby providing the effect of positioning the electronic device 10 and the effect of attachedly positioning while absorbing shocks, as shown in FIG. 4.

The support plate 100 can include two or more combined portions 120 according to the size of the first plate member 110. In the present embodiment, the combined portion 120 preferably includes a first combined portion 122, a second combined portion 124 and a third combined portion 126, wherein the first combined portion 122 is the furthest from the foldable portion 160, and the third combined portion 126 is the closest from the foldable portion 160. When the combining portion 210 moves in a direction toward the foldable portion 160 to combine the combined portion 120, the included angle θ increases gradually. That is to say, when the combining portion 210 is combinedly positioned to the third combined portion 126 of the combined portion 120, the included angle θ is larger than the included angle θ when positioned to the second combined portion 124. On the contrary, when the combining portion 210 moves in a direction away from the foldable portion 160 to combine the combined portion 120 (the second combined portion 124), the included angle θ decreases gradually.

It should be noted that the included angle θ is not limited to any particular angle, the included angle θ can be adjusted according to the user's requirement and different angles of the working surface which the contact portion 220 contact, so that a user can view on the electronic device 10 with a desired angle.

Figure 5:
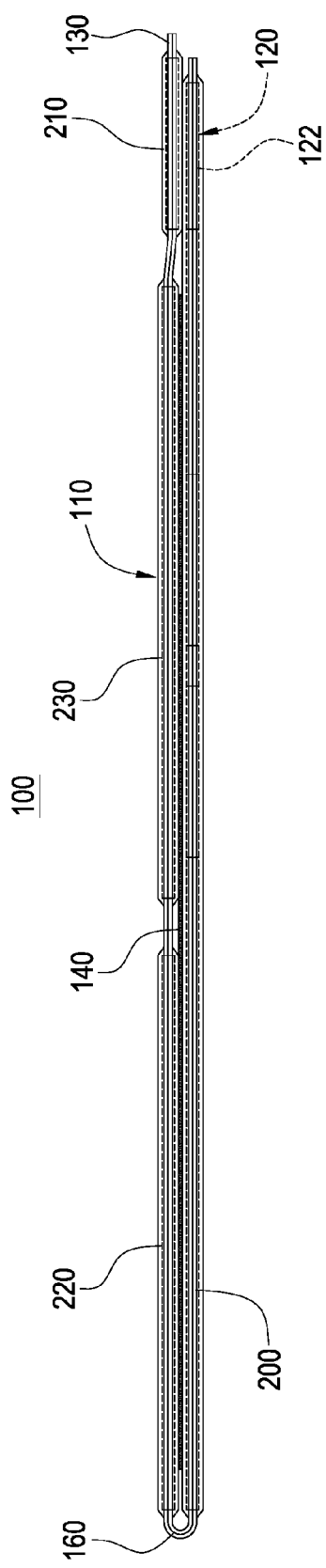
FIG. 5 is a cross-sectional view illustrating the support plate folded in half for storage according to the first embodiment of the present invention.
Figure 6:
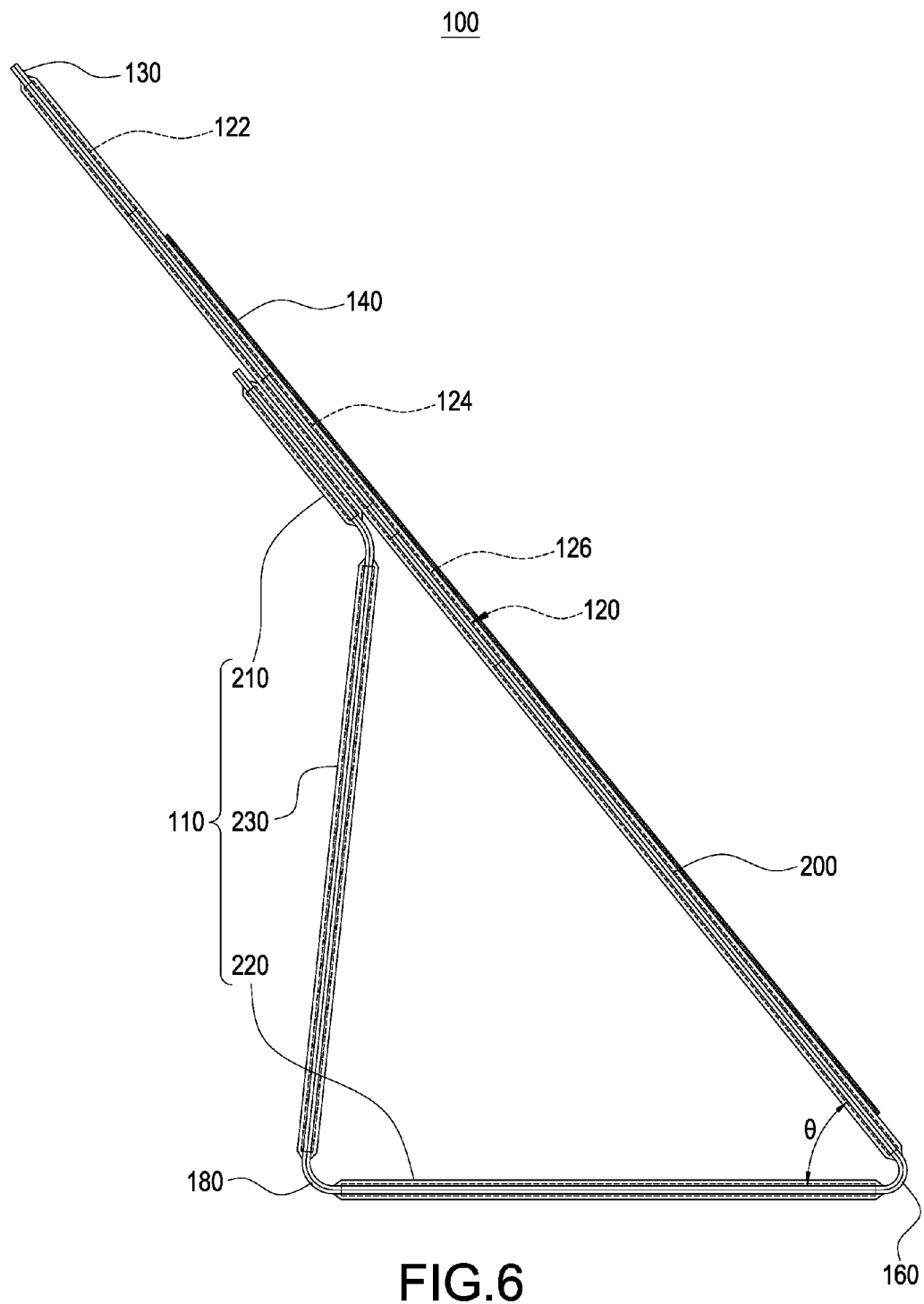
FIG. 6 is a cross-sectional view illustrating the support plate with another angle according to the first embodiment of the present invention.

Referring to FIG. 5, when the combining portion 210 and the first combined portion 122 of the combined portion 120 are combinedly positioned, the first plate member 110 and the second plate member 200 can be folded in half to become a flat sheet shape for easy storage and carried around conveniently. As shown in FIG. 5, it is preferable that the first plate member 110 and the second plate member 200 are symmetrical to each other, and have substantially the same length. However, in other embodiments, the first plate member 110 and the second plate member 200 can be asymmetrical and have different length as required.

Figure 7:
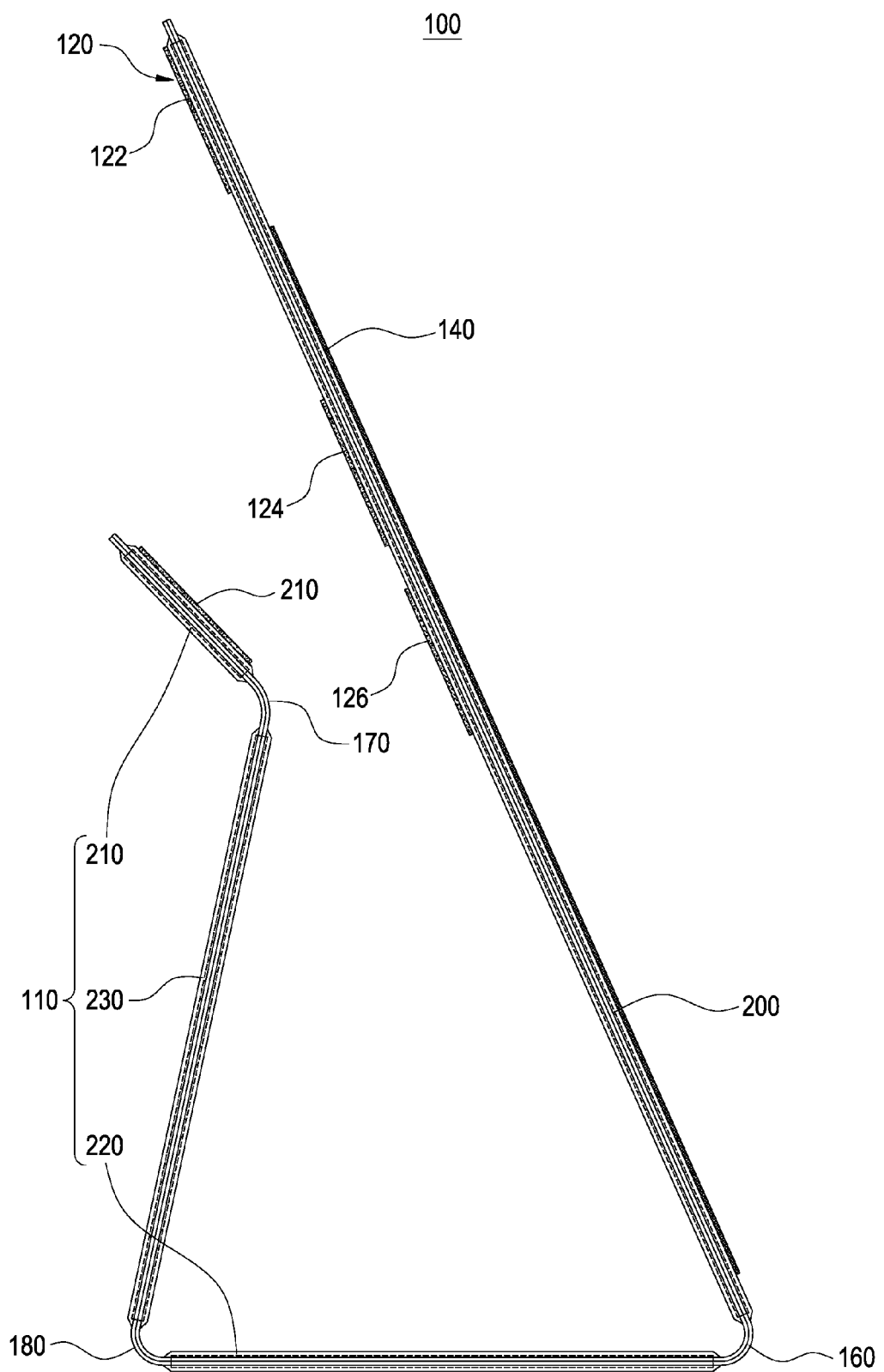
FIG. 7 is a cross-sectional view illustrating the support plate according to the second embodiment of the present invention.
Figure 8:
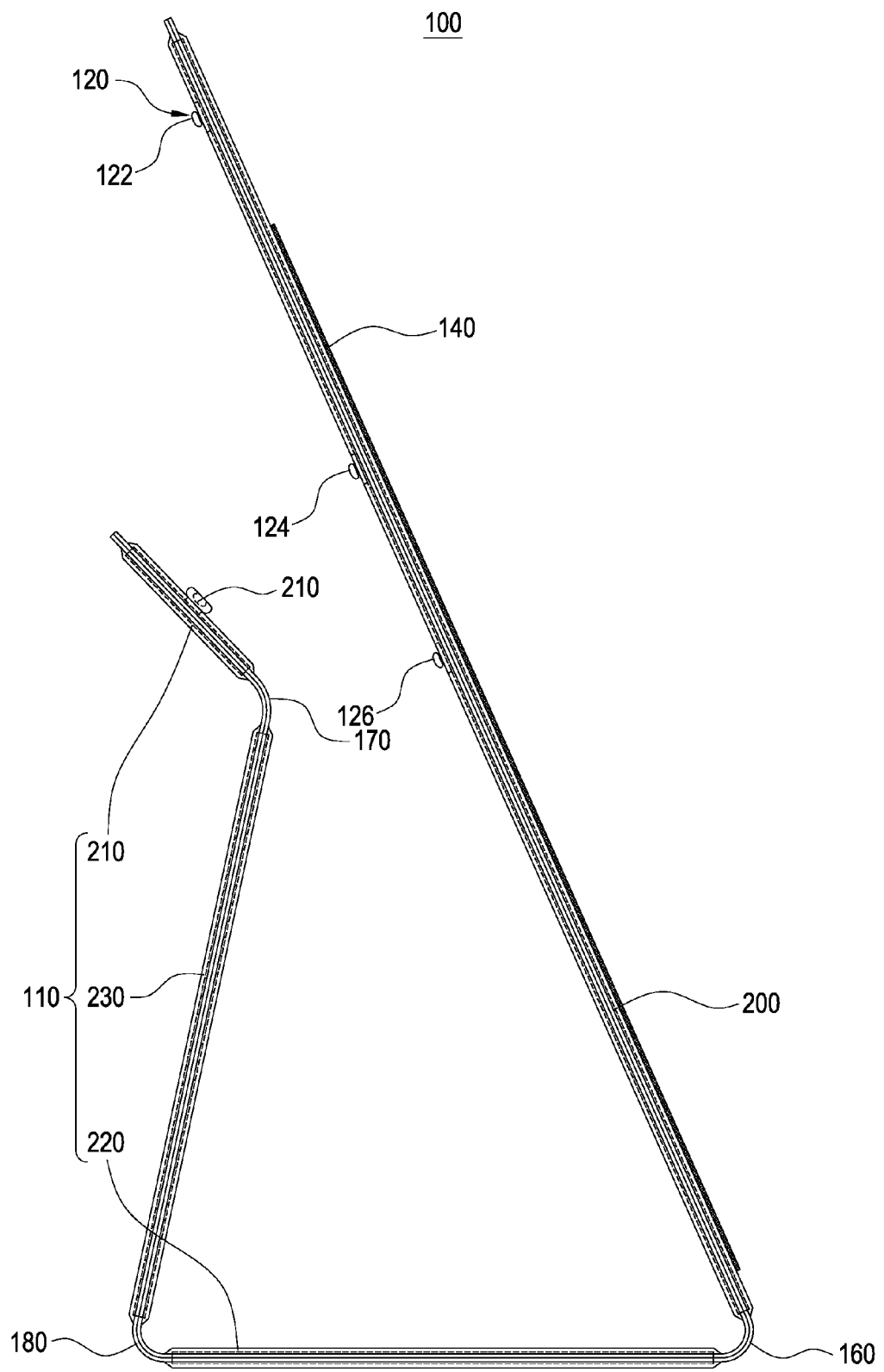
FIG. 8 is a cross-sectional view illustrating the support plate according to the third embodiment of the present invention.

The combining portion 210 in FIGS. 1 to 6 is preferably a magnet element, and the combined portion 120 is an iron metal element or an iron alloy element, wherein the combining portion 210 and the combined portion 120 can be interchanged, the present invention is not limited in this regard. In the embodiment shown in FIG. 7, the combining portion 210 and the combined portion 120 are respectively a sticking fastening element and a sticking fastener element; similarly, the combining portion 210 and the combined portion 120 can be interchanged, and the present invention is not limited in this regard. In the embodiment shown in FIG. 8, the combining portion 210 and the combined portion 120 can be a male buckle and a female buckle; similarly, the combining portion 210 and the combined portion 120 can be interchanged, and the present invention is not limited in this regard.

Furthermore, in the embodiment shown in FIGS. 1 to 8, the first plate member 110 includes a linking portion 230 and a plurality of bend portions 170, 180. The linking portion 230 is preferably disposed between the contact portion 220 and the combining portion 210 in order to support the weight of the second plate member 200 and even the electronic device 10. The bend portions 170, 180 are respectively disposed between the combining portion 210 and the linking portion 230 and between the linking portion 230 and the contact portion 220. The bend portions 170, 180 are provided to facilitate bending into suitable shapes like the foldable portion 160 does, and the bend portions 170, 180 can be considered as the covering portion 130.

Figure 9:
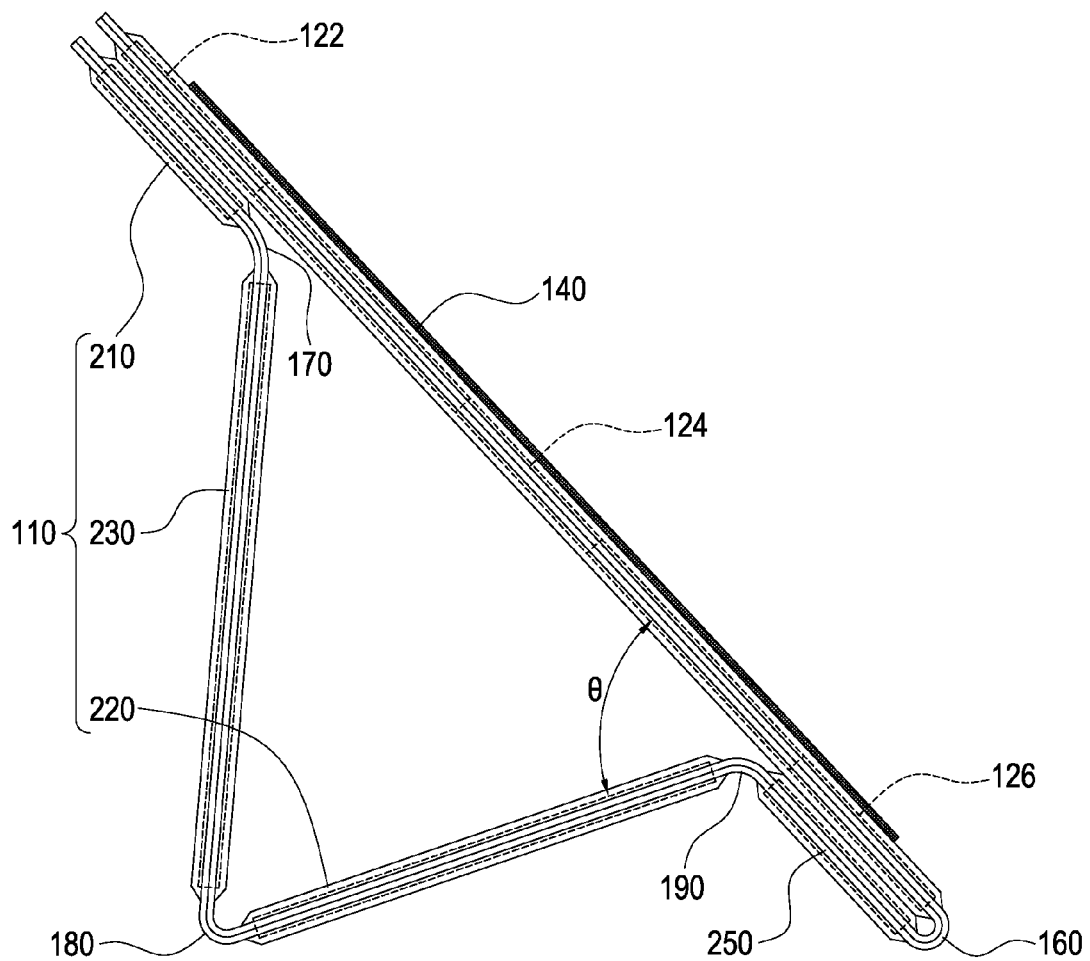
FIG. 9 is a cross-sectional view illustrating the support plate according to the fourth embodiment of the present invention.

Referring to FIG. 9, it shows a cross-sectional view of the fourth embodiment of the present invention. In the present embodiment, the first plate member 110 further includes a folding portion 250 adjacent to the foldable portion 160 and a bend portion 190 connected to the contact portion 220. That is to say, the folding portion 250 can be bent to be attached onto the second plate member 200 to shorten the length of the first plate member 110, so as to provide more angles for the users.

Therefore, the third combined portion 126 is preferably disposed corresponding to the folding portion 250 in a manner such that the folding portion 250 is attached and positioned on the second plate member 200. When the folding portion 250 and the second plate member 200 are bent to be attached to each other, the contact portion 220 does not contact the working surface in a surface contact manner. Instead, the foldable portion 160 and the bend portion 180 become two support lines to support the weight of the support plate 100 or even the electronic device 10.

When the combining portion 210 moves from the second combined portion 124 to the first combined portion 122 and is positioned thereto, the included angle θ becomes smaller. In the opposite situation, the included angle θ becomes larger. The other structure and connecting relationship of the present embodiment are described in the foregoing embodiments, so details descriptions are not repeated herein for brevity.

The support plate 100 of the present invention can stably support the electronic device 10 and can be readily expanded or received. The support plate 10 can be disposed upright to support the electronic device 10 as described in the above-mentioned embodiments. In other different embodiments, the support plate 100 can also be placed horizontally to elevate the electronic device 10 and facilitate cooling or other effects therefor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A support plate, for supporting an electronic device, comprising a first plate member, a foldable portion, and a second plate member, the foldable portion being connected to the first plate member and the second plate member, the first plate member including a combining portion far away from the foldable portion and a contact portion adjacent to the foldable portion, the second plate member including at least one combined portion and a non-slip element attached on a side surface of the second plate member, the combining portion being foldable to combined with the combined portion, wherein the contact portion supports the second plate member and forms an included angle with the second plate member.

2. The support plate of claim 1, wherein the support plate includes two or more combined portions according to a size of the first plate member.

3. The support plate of claim 2, wherein when the combining portion moves in a direction away from the foldable portion to combine the combined portion, the included angle decreases gradually, and when the combining portion moves in a direction toward the foldable portion to combine with the combined portion, the included angle increases gradually.

4. The support plate of claim 2, wherein the combining portion is a magnet element, a sticking fastening element, or a male buckle, and the combined portion is an iron metal element or an iron alloy element, a sticking fastener element, or a female buckle.

5. The support plate of claim 1, wherein when the combining portion moves in a direction away from the foldable portion to combine the combined portion, the included angle decreases gradually, and when the combining portion moves in a direction toward the foldable portion to combine with the combined portion, the included angle increases gradually.

6. The support plate of claim 1, further comprising a covering portion, the covering portion covering the first plate member and the second plate member, wherein the foldable portion is the covering portion between the first plate member and the second plate member.

7. The support plate of claim 1, wherein the covering portion consists of non-woven fabric, rubber, polyurethane (PU), or plastic.

8. The support plate of claim 1, wherein the non-slip element is disposed on one side opposite to where the combining portion and the combined portion are combinedly positioned, and the non-slip element is an attachable and flexible pad consisting of thermally deformable rubber, resin and a binding agent.

9. The support plate of claim 1, wherein the first plate member further includes a linking portion, a folding portion, and a plurality of bend portions, the linking portion is disposed between the contact portion and the combining portion, the folding portion is closer to the foldable portion than the contact portion, and the folding portion is foldable to be attached onto the second plate member.

10. The support plate of claim 9, wherein the bend portions are respectively disposed between the combining portion and the linking portion, between the linking portion and the contact portion, and between the contact portion and the folding portion.

11. The support plate of claim 1, wherein the first plate member and the second plate member are symmetrical to each other, and the first plate member and the second plate member have the same or different length.

* * * * *